(12) United States Patent
Choi

(10) Patent No.: US 7,668,548 B2
(45) Date of Patent: Feb. 23, 2010

(54) METHOD OF EFFICIENTLY RESELECTING CELL IN MOBILE STATION USING GPS

(75) Inventor: Yoon-Suk Choi, Daejeon (KR)

(73) Assignee: Samsung Electronics Co., Ltd (KR)

( * ) Notice: Subject to any disclaimer, the term of this patent is extended or adjusted under 35 U.S.C. 154(b) by 576 days.

(21) Appl. No.: 11/391,956

(22) Filed: Mar. 29, 2006

(65) Prior Publication Data

US 2006/0234757 A1 Oct. 19, 2006

(30) Foreign Application Priority Data

Apr. 14, 2005 (KR) ...................... 10-2005-0031063

(51) Int. Cl.
*H04Q 7/20* (2006.01)
*H04B 17/00* (2006.01)
*H04B 7/00* (2006.01)

(52) U.S. Cl. ................. 455/437; 455/452.1; 455/67.11; 455/226.1; 455/509

(58) Field of Classification Search ............. 455/435.1, 455/435.2, 436, 437, 439, 440, 444, 445, 455/452.1, 456.1

See application file for complete search history.

(56) References Cited

U.S. PATENT DOCUMENTS

| | | | | |
|---|---|---|---|---|
| 5,396,647 A | * | 3/1995 | Thompson et al. ........... | 455/440 |
| 5,933,785 A | * | 8/1999 | Tayloe ......................... | 455/558 |
| 6,434,389 B1 | * | 8/2002 | Meskanen et al. ........... | 455/437 |
| 7,082,305 B2 | * | 7/2006 | Willars et al. ............... | 455/441 |
| 7,299,045 B2 | * | 11/2007 | Hsu et al. .................... | 455/437 |
| 7,366,475 B2 | * | 4/2008 | Ramesh .................... | 455/67.13 |
| 7,409,214 B2 | * | 8/2008 | Lee ............................ | 455/436 |
| 7,430,420 B2 | * | 9/2008 | Derakhshan et al. ...... | 455/452.2 |
| 2003/0148774 A1 | * | 8/2003 | Naghian et al. ............. | 455/456 |

FOREIGN PATENT DOCUMENTS

| | | |
|---|---|---|
| DE | 197 41 701 | 3/1999 |
| EP | 1 089 581 | 12/2003 |

* cited by examiner

*Primary Examiner*—Tilahun Gesesse
(74) *Attorney, Agent, or Firm*—The Farrell Law Firm, LLP

(57) ABSTRACT

A cell reselection function in a mobile station (MS) through an adjacent cell search is provided. The MS in an idle state obtains its own moving speed and current location using Global Positioning System (GPS) location information, calculates a predicted moving location, and stores the predicted moving location. Thereafter, when measurement values of adjacent cells are similar, or when the adjacent cells are located in different location areas (LAs), the MS can efficiently search for the best cell from among the adjacent cells based on the location information and select the best cell as a new serving cell.

15 Claims, 4 Drawing Sheets

METHOD OF EFFICIENTLY RESELECTING CELL IN MOBILE STATION USING GPS

PRIORITY

This application claims priority under 35 U.S.C. § 119 to an application entitled "Method of Efficiently Reselecting Cell in Mobile Station Using GPS" filed in the Korean Intellectual Property Office on Apr. 14, 2005 and assigned Serial No. 2005-31063, the contents of which are incorporated herein by reference.

BACKGROUND OF THE INVENTION

1. Field of the Invention

The present invention relates generally to a method of selecting/reselecting a cell in a mobile station, and in particular, to a method of efficiently reselecting a cell in a mobile station using Global Positioning System (GPS).

2. Description of the Related Art

Commonly, when a mobile station is turned on, the mobile station searches for a cell of a dedicated Public Land Mobile Network (PLMN), selects the cell as a serving cell, negotiates a channel, and accesses the PLMN. While the mobile station is maintaining a power-on state, cell selection and reselection is continuously performed. In particular, when the mobile station moves from a serving cell to another cell, the mobile station reselects a cell based on signal quality instead of the serving cell getting away from the mobile station. This cell reselection process of the mobile station includes the step of selecting a more proper and related Radio Access Technology (RAT) based on idle mode electronic wave measurement and cell reselection criteria. As described above, according to the conventional cell reselection method, a mobile station reselects an adjacent cell satisfying the cell reselection criteria from among cells suitable for the mobile station.

The cell reselection process will now be described with reference to FIG. 1. FIG. 1 is a diagram of a conventional mobile communication system. Referring to FIG. 1, a mobile communication system, such as Global System for Mobile Communication (GSM)/General Packet Radio Service (GPRS), includes a plurality of cells 102 to 112, each defining a wireless coverage area established by a fixed site base station system (BSS) located in the corresponding cell. For example, a cell 102 defines a wireless coverage area established by a base station system (BSS) 114, and similarly, each of the other cells 104 to 112 defines a wireless coverage area established by a BSS (not shown) located in the corresponding cell.

When a mobile station (MS) 100 moves from a location X of the mobile communication system to a location Y, the MS 100 continuously monitors signal characteristics from the BSSs of the cells 102 to 112 and selects a cell based on various selection criteria. For example, if a cell 110 is selected as an optimal coverage area according to a signal characteristic from the cell 110 based on the cell reselection criteria, the cell 110 is considered as a serving cell or a cell to/from which the MS 100 transmits/receives packet data.

As described above, the MS 100 continuously monitors signal characteristics from the cells 102 to 112. For example, as the MS 100 moves from the location X to the location Y along the path marked by the dashed line, the MS 100 moves from the coverage area of serving cell 110 to the coverage areas of the other cells, e.g., the cells 112 and 106. When the MS 110 determines another cell, e.g., the cell 112, as an optimal cell according to a signal characteristic from the cell 112, the MS 110 reselects the cell 112 as the serving cell. When the MS 110 determines another cell, e.g., the cell 106, as an optimal cell according to a signal characteristic from the cell 106, the MS 110 reselects the cell 106 as the serving cell.

In more detail, if the MS 100 moves from the cell 110 corresponding to the location X to the cell 106 corresponding to the location Y, the MS 100 calculates a C1 value, which is a path loss criterion parameter, a C2 value, which is a reselection criterion parameter, a C4 value, which is a signal strength threshold criterion parameter, a C31 value, which is a signal level threshold criterion parameter, and a C32 value, which is a cell ranking criterion parameter. As a result of the calculations, it is determined that the cell strength is good in cell 112 and cell 106, and the cells 102 and 112 are improper cells in which the service provided by a current terminal cannot be maintained. When the MS 100 moves from the cell 110, which is the serving cell, to the cell 106, the cell 112, which is an improper cell, has the priority of the cell reselection according to the cell strength to receive. Then, the MS 100 determines whether the cell 112 is a proper cell by receiving cell information including whether it is proper or not from the cell 112. As a result of the determination, if the MS 100 determines that the cell 112 is an improper cell, the MS 100 receives cell information indicating whether it is proper or not from the cell 106, which has the next priority of the cell selection according to the cell strength to receive, and determines whether the cell 106 is a proper cell. As a result of the determination, if the MS 100 determines that the cell 106 is a proper cell, the MS 100 camps on the cell 106.

As described above, an MS camped on a serving cell in a mobile communication system performs cell reselection based on the cell reselection criteria. The cell reselection criteria by which the MS attempts cell reselection will now be described. A first cell reselection criterion is where the C1 value, which is the path loss criterion parameter, is greater than a set threshold in the MS camped on the serving cell, and in this case, the cell reselection is performed. A second cell reselection criterion is a downlink signaling failure. A third cell reselection criterion is where a better cell is discovered in the same location area based on the C2 value, the C31 value, and the C32 value. A fourth cell reselection criterion is where a far better cell is discovered in another location area.

In the conventional cell reselection process, if an adjacent cell satisfying the cell reselection criteria described above is discovered, an MS receives from a network cell information including whether the adjacent cell is proper. Thereafter, the MS determines whether the adjacent cell is proper based on the received cell information, and if the MS determines that the adjacent cell is proper, the MS performs the cell reselection for the adjacent cell. If the MS determines that the adjacent cell is improper, the MS performs the same process again for a cell having the next priority according to the cell strength. As a result of the determination, if the MS determines that the cell is a proper cell, the MS camps on the cell.

In detail, if an MS providing the conventional GSM/GPRS function cannot receive a relevant service in a current serving cell in an idle state, a cell reselection process of searching for a new cell in which the service can be provided is necessary. To do this, when the MS searches for a proper cell, the MS calculates the C1, C2, C4, C31, and C32 values based on periodically measured transmission power values of BSSs in adjacent cells and its own transmission power value. When the MS searches for the most proper cell at the time of the cell reselection, the MS selects a new cell by which the service can be maintained by determining whether the new cell is a proper cell based on the calculated values.

SUMMARY OF THE INVENTION

As described above, in the prior art, an MS periodically performs measurement for adjacent cells, and when an event is generated, that is, when a measurement value of an adjacent cell is greater than that of a current serving cell or exceeds a set threshold, if it is difficult for the MS to receive a service from the current serving cell, the MS in an idle state performs the cell reselection process of selecting a cell having a measurement value, e.g., a transmission power value, greater than the current serving cell as a new serving cell. However, if measurement values of adjacent cells of the MS are similar to those of the serving cell, to determine which cell is an optimal cell, the cell reselection can be frequently performed. Moreover, if the adjacent cells having the measurement values are located in different location areas (LAs), every time when the serving cell is frequently changed, a location area update (LAU) process between the MS and a network is required. Thus, in the prior art, when the MS is located in an area in which cells having similar measurement values exist, the cell reselection process must be repeated, and if the cells are located in different LAs, the LAU process must also be repeated, thereby decreasing cell reselection efficiency.

An object of the present invention is to substantially solve at least the above problems and/or disadvantages and to provide at least the advantages below. Accordingly, an object of the present invention is to provide a method of allowing a mobile station (MS) to efficiently reselect a cell so that unnecessary cell reselection does not frequently occur.

Another object of the present invention is to provide a method of efficiently reselecting a cell by performing a cell search based on location information of a mobile station (MS) in an idle state and performing the cell reselection.

According to one aspect of the present invention, there is provided a method of reselecting a cell by a mobile station (MS) in an idle state using Global Positioning System (GPS), the method includes the steps of obtaining location change information by periodically measuring GPS location information; measuring signal characteristics from adjacent cells and comparing them to a current cell; determining whether differences between the measurement values are equal to or less than a threshold; and if the differences between the measurement values are equal to or less than the threshold as a result of the determination, performing the cell reselection based on stored base station system (BSS) GPS location information of adjacent cells and the location change information so that a service is maintained.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
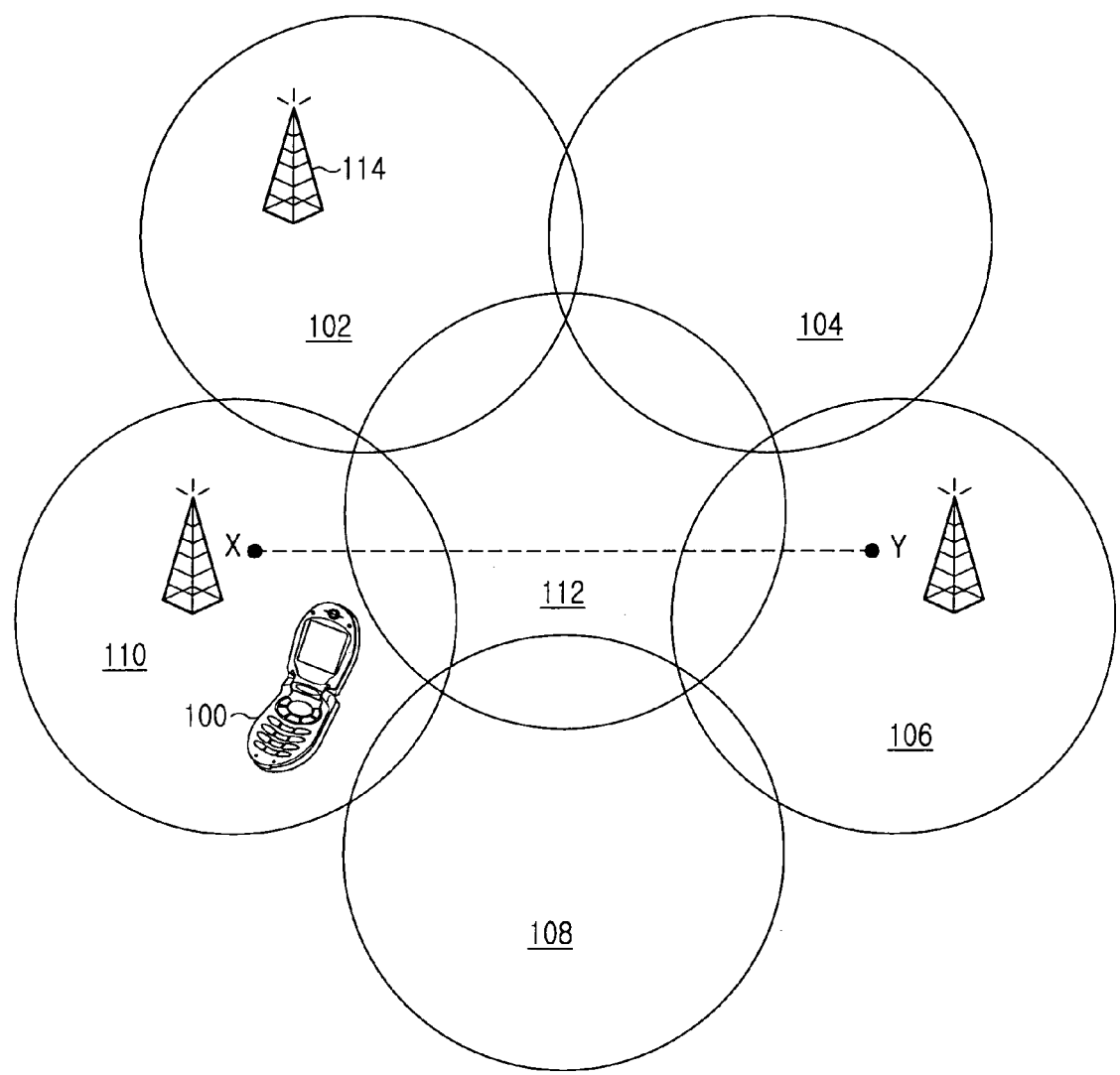
FIG. 1 is a diagram of a conventional mobile communication system used to describe an operation of the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

In the present invention, a cell reselection function is implemented through an adjacent cell search in a mobile station (MS). To do this, the MS in an idle state obtains its own speed and current location using Global Positioning System (GPS) location information and calculates and stores a predicted destination location, and when measurement values for adjacent cells are similar, or when the adjacent cells having the measurement values are located in different location areas (LAs), the MS efficiently searches for and selects the most proper cell from among the adjacent cells based on the location information.

In the embodiments of the present invention, if the measurement values of a serving cell and adjacent cells are similar to each other, an MS is limited in its cell reselection process. That is because the number of cell reselection processes increases in order to maintain a service in an area in which adjacent cells having similar measurement values exist. Thus, in the present invention, reliability of service quality is considered, since the MS performs cell management more efficiently by preventing the cell reselection from being frequently performed.

Figure 2:
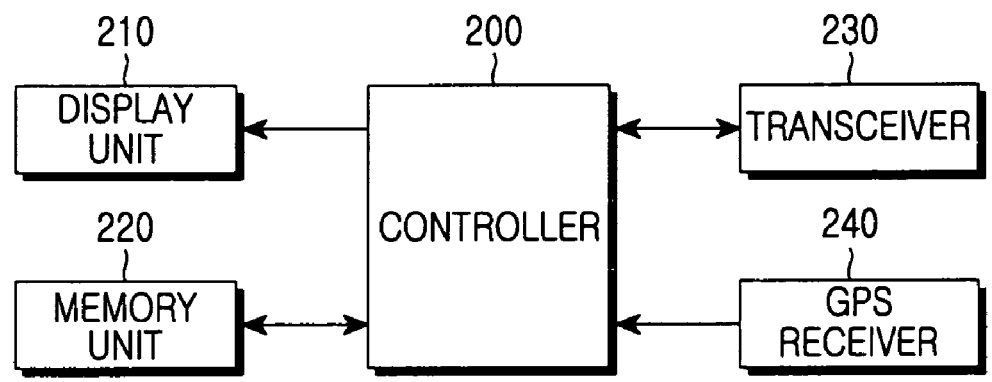
FIG. 2 is a block diagram of a mobile station (MS) according to a preferred embodiment of the present invention.

Components and their operations of the MS 100 in which the said function is implemented will now be described with reference to FIG. 2. FIG. 2 is a block diagram of the MS 100 according to a preferred embodiment of the present invention.

Referring to FIG. 2, a controller 200, controls a general operation of the MS 100 such as telephone functions and data transmission/reception functions. The controller 200 continuously monitors signal characteristics from base station systems (BSSs), selects a cell to/from which data is transmitted/received based on cell reselection criteria, and camps on the selected cell. A measurement value of a serving cell, e.g., a transmission power value of a BSS, and measurement values of adjacent cells are updated according to the movement of the MS even if the controller 200 is in an idle state.

If the controller 200 cannot receive a service from a current serving cell, the controller 200 performs measurement for adjacent cells to search for a new cell when moving from the current serving cell. In particular, the controller 200 performs a learning technique of repeatedly acknowledging a moving speed and a current location using GPS location information received through a GPS receiver 240 to achieve an efficient cell search according to an embodiment of the present invention. After calculating a predicted moving location based on the learning technique, the controller 200 determines a new cell based on the predicted moving location calculated at the time when the cell reselection is required and selects the new cell as a serving cell.

Under control of the controller 200, a display unit 210 displays display data corresponding to key-input data input by a user or displays an operation state of the MS 100 using icons and characters. In addition, when a function required by the user is set or operated, the display unit 210 shows a setting or operating state in a visual way under a control of the controller 200.

A memory unit 220 connected to the controller 200 is comprised of read only memory (ROM), random access memory (RAM), and a voice memory for storing a plurality of programs and information required to control of operations of the MS 100. In addition, according to an embodiment of the present invention, the memory unit 220 stores location change information, such as the moving speed, the current location, and the predicted moving location, which is calculated using the GPS location information, under a control of the controller 200. Moreover, the memory unit 220 stores BSS GPS location information of adjacent cells obtained periodically or in a power-on state under a control of the controller 200. The BSS GPS location information can be stored when the MS 100 is turned off or can be periodically updated and stored. The location change information and the BSS GPS location information can be stored in the memory unit 220 included in the MS 100 or a subscriber identity module (SIM) card. Since the latest BSS GPS location information is stored when the MS 100 is turned off, the controller 200 can reuse location information of BSSs adjacent to the MS 100, which was used last, when the MS 100 is turned on and can perform a new cell selection process of determining a serving cell using the BSS GPS location information with current GPS location information of the MS 100.

Under a control of the controller 200, a transceiver 230 transmits/receives radio frequency (RF) signals to/from BSSs through an antenna and transmits/receives communication signals to/from a network, e.g., transmits a BSS GPS location information request message to the network and receives a response message in response to the request message, according to an embodiment of the present invention.

The GPS receiver 240 equipped in the MS 100 receives GPS signals from GPS satellites through an antenna to immediately obtain a location of the MS 100. In other words, the MS 100 receives GPS information transmitted from the GPS satellites through the equipped GPS receiver 240.

Figure 3:
FIG. 3 is a signaling diagram illustrating a method of obtaining BSS GPS location information according to an embodiment of the present invention.
Figure 4:
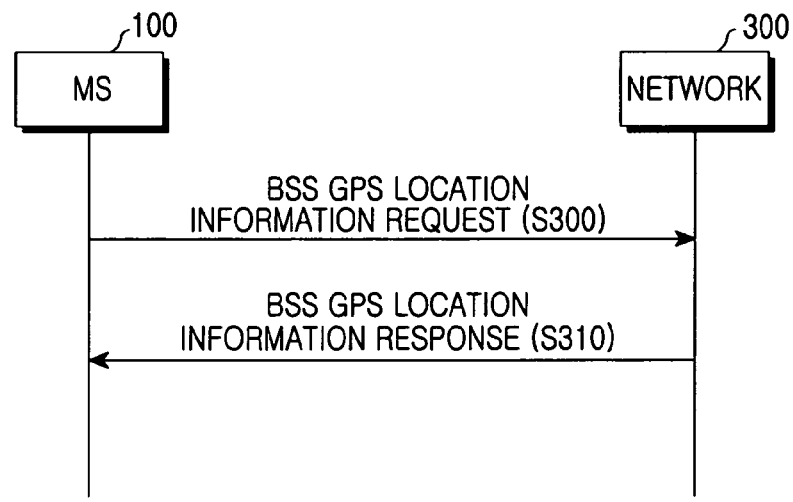
FIG. 4 is a signaling diagram illustrating a method of obtaining BSS GPS location information according to another embodiment of the present invention.

There are various methods by which the MS 100 obtains BSS GPS location information. As examples, two methods are illustrated in FIGS. 3 and 4. FIG. 3 is a signaling diagram illustrating a method of obtaining the BSS GPS location information according to an embodiment of the present invention, and FIG. 4 is a signaling diagram illustrating a method of obtaining the BSS GPS location information according to another embodiment of the present invention.

The services of providing the BSS GPS location information are realtime services, and the MS 100 can receive the BSS GPS location information of adjacent cells from a network 300 through a message or a general packet radio service (GPRS).

Referring to FIG. 3 as an example, in step S200, the MS 100 can receive a BSS GPS location information indicator message from the network 300 in the last stage of a location update procedure. In another case, the MS 100 can periodically receive the BSS GPS location information indicator message from the network 300.

Referring to FIG. 4 as another example, in step S300, the MS 100 transmits a BSS GPS location information request message to the network 300 to request location information necessary to the cell reselection at the time when the cell reselection is required. In step 310, the network 300 receiving the request message transmits a BSS GPS location information response message indicating GPS location information of BSSs in cells managed by the network 300 to the MS 100. When the MS 100 receives the BSS GPS location information response message from the network 300, the MS 100 extracts BSS GPS location information from the BSS GPS location information response message and stores the extracted BSS GPS location information. The BSS GPS location information is used to determine a new cell. Herein, it is assumed that the network 300 knows the GPS location information of the BSSs in the cells managed by the network 300 when generating the BSS GPS location information response message.

Though cases of receiving the BSS GPS location information in realtime have been described, the BSS GPS location information can be built into the MS 100 as a built-in service by a communication service provider when the MS 100 is put on the market.

According to a preferred embodiment of the present invention, the MS 100 should know its own location change information in advance using the GPS location information before the cell reselection is performed. Thus, the MS 100 equipped with a GPS function obtains its own moving speed and current location information using the GPS location information received through the GPS receiver 240 and periodically updates the moving speed and current location information. Herein, the MS 100 can learn a location change based on the moving speed and past location, calculate its new GPS location information, and use the calculated GPS location information to assist in the determination of a new cell. That is, the MS 100 obtains its own moving speed and location information using periodically received GPS location information and can calculate predicted location information by predicting where and how fast the MS 100 is going to move.

When a new cell should be selected according to movement of the MS 100, the MS 100 calculates the C1 value, which is the path loss criterion parameter, the C2 value, which is the reselection criterion parameter, the C4 value, which is the signal strength threshold criterion parameter, the C31 value, which is the signal level threshold criterion parameter, and the C32 value, which is the cell ranking criterion parameter based on transmission power values of BSSs located in cells and its own transmission power value. The MS 100 selects a new cell based on its own moving speed and location information or the predicted location information with the calculated C1, C2, C4, C31, and C32 values. As described above, the MS 100 selects the most proper cell using the predicted location information even if the measurement values of cells near a current location are similar, thereby preventing unnecessary cell reselection from being repeated.

Figure 5:
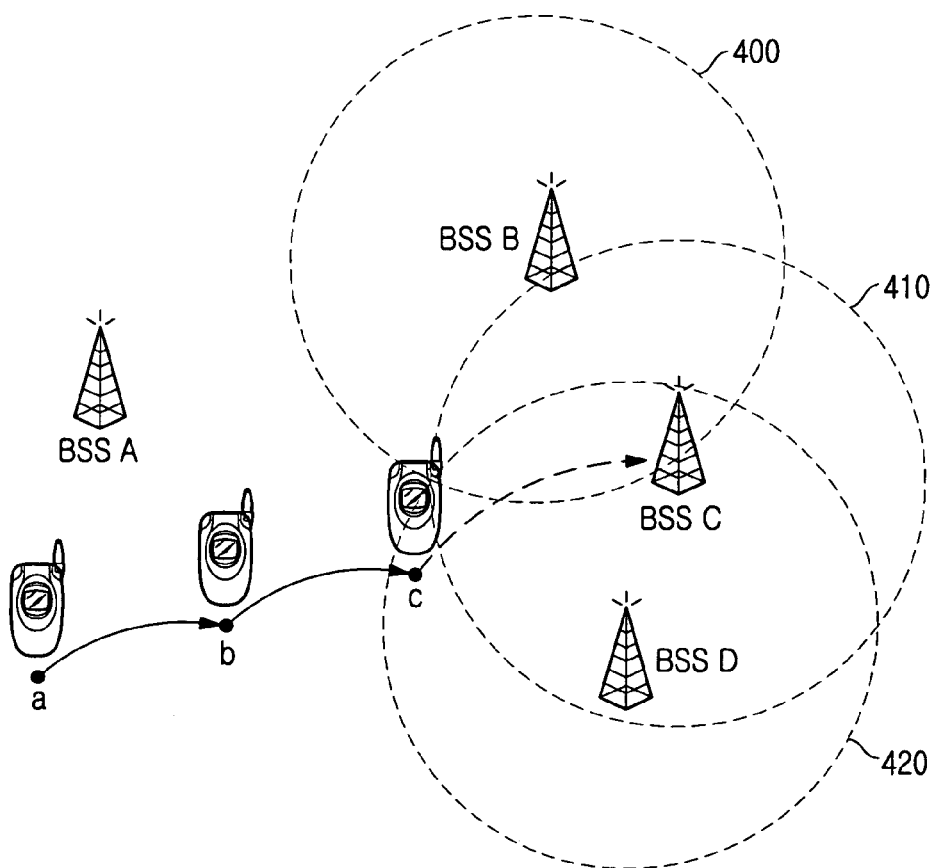
FIG. 5 is a diagram illustrating a cell reselection process by movement of an MS according to an embodiment of the present invention.

A detailed example to which the present invention is applied will now be described with reference to FIG. 5. FIG. 5 is a diagram illustrating a cell reselection process by movement of an MS according to an embodiment of the present invention.

In a 2G or 3G mobile communication system issued by European Telecommunications Standards Institute (ETSI) or Third Generation Partnership Project (3GPP) according to a preferred embodiment of the present invention, the MS should maintain a service by searching for a servicing cell providing the service while maintaining in an idle state. Thus, if the MS cannot receive the service from a current serving cell due to a location change according to the movement of the MS, the MS should select a new cell, which can provide the service, using the cell reselection function. For example, as shown in FIG. 5, if the MS is located near a cell 400, a cell 410, and a cell 420, which output similar signal characteristics, and if the cells 400, 410, and 420 are located in different location areas (LAs), a location area update (LAU) process can be frequently performed according to the third generation partnership project (3GPP) specification TS 45.008. Thus, a method of allowing least LAU processes through least cell reselection operations to which a preferred embodiment of the present invention is applied will now be described.

In detail, referring to FIG. 5, when the MS is moving away from a coverage area of a BSS A according to the movement of the MS from a location a of the mobile communication system to a location c through a location b, the MS continuously monitors signal characteristics from BSSs of the cells 400, 410, and 420 and selects a proper cell through a corresponding BSS based on selection criteria. According to a preferred embodiment of the present invention, the MS determines its own moving speed and location using GPS location information periodically received through the GPS receiver 240 according to the movement of the MS from the location a to the location c through the location b and obtains predicted location information by calculating a next location based on the determined moving speed and location. For example, when the MS in an idle state is moving away from the cell of the BSS A, and when the MS is located near the cell 400 of a BSS B, the cell 410 of a BSS C, and the cell 420 of a BSS D, the MS continuously monitors the signal characteristics, e.g., transmission power values, from the cells 400, 410, and 420. The MS calculates the C1, C2, C4, C31, and C32 values using its own signal characteristic and the monitored signal characteristics. The MS searches for an optimal cell to maintain the service using the calculated C1, C2, C4, C31, and C32 values and selects a cell considered to be the optimal cell as a serving cell.

However, if it is difficult to determine a next serving cell since the C1, C2, C4, C31, and C32 values obtained based on the transmission power values measured from the cells 400, 410, and 420 and the MS's transmission power value are almost similar, the MS uses the GPS function according to the present invention. That is, the MS uses location change information including its own moving speed, location, and predicted moving location, which are obtained using the GPS function, in a new cell selection process.

In detail, the MS determines a predicted moving location to which the MS is going to move through the location change information in a state where the MS knows location information of BSSs of cells adjacent to a current location of the MS. Then, even if the MS is located in an area where the cell reselection is frequently performed, or if the MS is located in a location where the LAU frequently occurs since the cells are located in different LAs, the MS can select a next serving cell by determining an optimal cell based on BSS GPS location information and location change information.

For example, when the MS moves from the location a to the location c through the location b, if the MS uses the location change information obtained by the GPS function, the MS can determine its own moving speed and location and simultaneously know which location the MS will move to in the future. Through this process, if the MS is located in an area where a cell reselection situation is frequently generated since the C1, C2, C4, C31, and C32 values from the adjacent cells 400, 410, and 420 are similar, or if the MS is located in an area where the LAU frequently occurs since the cells are located in different LAs, the MS can determine that the MS is approaching the BSS C by comparing each BSS location with its predicted moving location.

The MS determines that the most proper cell is the cell 410 managed by the BSS C using the results of the above determination, selects the cell 410 as a serving cell, and maintains the cell 410 as the serving cell. Likewise, if an MS uses location change information obtained through the GPS function in a state where the MS knows BSS GPS location information, the most proper cell can be selected, and thereby, the MS can prevent unnecessary cell reselection processes and minimize unnecessary LAU processes.

Figure 6:
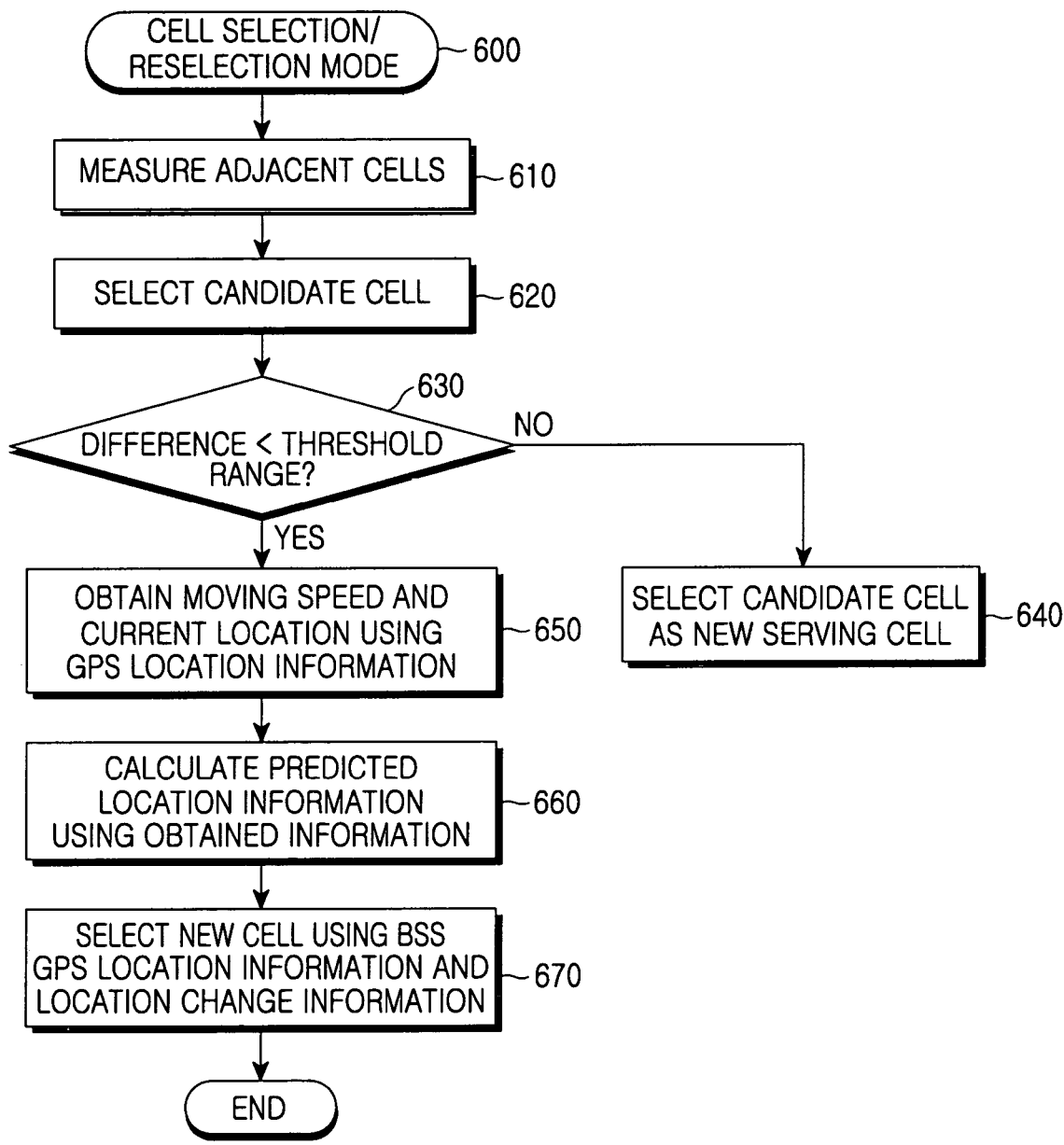
FIG. 6 is a flowchart illustrating a process of reselecting a cell in an MS using GPS information according to an embodiment of the present invention.

FIG. 6 is a flowchart illustrating a process of reselecting a cell in an MS using GPS information according to a preferred embodiment of the present invention.

Referring to FIG. 6, if it is difficult for the MS to receive a service from a current serving cell, the MS should select a new cell, which can provide the service. This process is performed in a cell selection/reselection mode. In a state where the cell selection/reselection mode is performed in step 600, the MS measures signal characteristics from the current serving cell and adjacent cells in step 610. In step 620, the MS selects a candidate cell, which can be a new serving cell that can provide the service to maintain the service. Herein, the MS calculates the C1, C2, C4, C31, and C32 values based on periodically measured transmission power values of the adjacent cells and its own transmission power value. In step 630, the MS determines whether a difference between the candidate cell measurement value and each adjacent cell measurement value is within a threshold range.

If the difference is equal to or less than the threshold in step 630, i.e. if it is difficult to determine a cell as the new serving cell since the measurement values of the adjacent cells are similar, the GPS function is used. If a difference obtained by subtracting each adjacent cell measurement value from the candidate cell measurement value is greater than a predetermined threshold, that is, if the newly selected candidate cell has a far greater measurement value than other cells, since an optimal cell can be determined, in step 640, the MS selects the current candidate cell as a new serving cell and performs an operation according to a general cell reselection process.

In step 650, the MS obtains its own moving speed and current location information using GPS location information. In step 660, the MS calculates predicted location information using the moving speed and current location information. The MS according to a preferred embodiment of the present invention can obtain various kinds of location change information such as moving speed information, current location information, and predicted location information using the GPS function. In step 670, the MS selects a cell corresponding to a BSS related to its own predicted moving location as a new serving cell using each BSS GPS location information and the location change information obtained by various methods according to the present invention.

As described above, according to the present invention, MSs located in various LAs can prevent frequent signal processing with a network by using GPS location information, thereby performing efficient cell management. In addition, the MSs can be prevented from performing unnecessary cell reselection processes by limiting the cell reselection process in an area where reception power values from adjacent cells are similar.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of reselecting a cell in a mobile station (MS) in an idle state using Global Positioning System (GPS), the method comprising the steps of:

obtaining location change information by periodically measuring GPS location information;

measuring signal characteristics from each of adjacent cells;

selecting a candidate cell;

calculating, for each of the adjacent cells other than the candidate cell, a difference between the signal characteristics of the adjacent cell and signal characteristics of the candidate cell;

determining, for each of the adjacent cells other than the candidate cell, whether the calculated difference is greater than a predetermined threshold; and if each of the calculated differences is greater than the predetermined threshold, selecting the candidate cell as a serving cell of the MS, and otherwise, performing the cell reselection based on stored Base Station System (BSS) GPS location information of adjacent cells and the location change information.

2. The method of claim 1, further comprising:

transmitting, by the MS, a BSS GPS location information request message to a network;

receiving a BSS GPS location information response message from the network in response to the request message; and obtaining the BSS GPS location information from the BSS GPS location information response message and storing the obtained BSS GPS location information.

3. The method of claim 2, wherein the BSS GPS location information response message includes stored GPS location information of BSSs of cells managed by the network.

4. The method of claims 1, wherein the BSS GPS location information is periodically obtained from the network through a predetermined service.

5. The method of claim 4, wherein the BSS GPS location information is stored in one of a memory and a Subscriber Identity Module (SIM) card when the MS is turned off.

6. The method of claim 5, further comprising:

determining the serving cell based on the stored BSS GPS location information and current MS GPS location information when the MS is turned on.

7. The method of claim 1, wherein the BSS GPS location information is received from the network using a BSS GPS location information indicator message in the last stage of a location update procedure.

8. The method of claim 7, wherein the BSS GPS location information is stored in one of a memory and a Subscriber Identity Module (SIM) card when the MS is turned off.

9. The method of claim 8, further comprising:

determining a serving cell based on the stored BSS GPS location information and current MS GPS location information when the MS is turned on.

10. The method of claim 1, wherein the MS is manufactured with the BSS GPS location information supplied therein.

11. The method of claim 1, wherein obtaining the location change information comprises:

obtaining a moving speed and a current location of the MS from the GPS location information received using a GPS function;

calculating predicted location information using a learning technique based on the moving speed and current location; and updating location change information including the calculated moving speed, current location, and predicted location information and storing the updated location change information.

12. The method of claim 1, wherein measuring the signal characteristics comprises:

measuring transmission power values of BSSs of the adjacent cells and a transmission power value of the MS; and calculating a measurement value of each cell using the measured transmission power values.

13. The method of claim 12, wherein the measurement value of each cell includes at least one a path loss criterion parameter, a reselection criterion parameter, a signal strength threshold criterion parameter, a signal level threshold criterion parameter, and a cell ranking criterion parameter.

14. The method of claim 1, wherein the candidate cell is selected from among the adjacent cells.

15. The method of claim 1, further comprising:

if the adjacent cells are located in different Location Areas (LAs), performing the cell reselection using the GPS function.

* * * * *

UNITED STATES PATENT AND TRADEMARK OFFICE
CERTIFICATE OF CORRECTION

PATENT NO. : 7,668,548 B2  Page 1 of 1
APPLICATION NO. : 11/391956
DATED : February 23, 2010
INVENTOR(S) : Yoon-Suk Choi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 907 days.

Signed and Sealed this

Seventh Day of December, 2010

David J. Kappos
*Director of the United States Patent and Trademark Office*